E. J. AND P. J. SCRAY.
BOLT.
APPLICATION FILED FEB. 17, 1920.
1,361,627.
Patented Dec. 7, 1920.
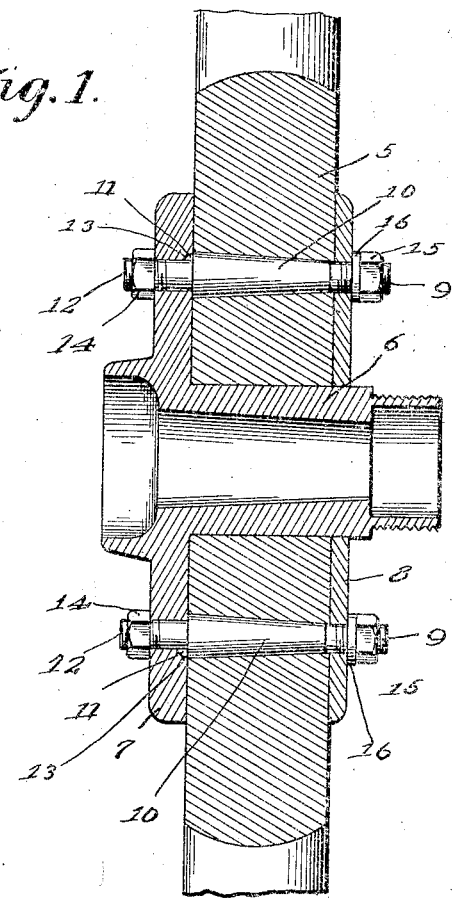
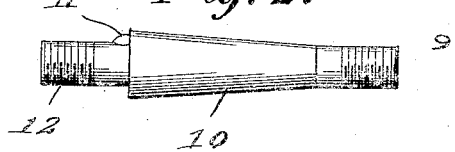
P. J. Scray.
E. J. Scray.
INVENTORS

UNITED STATES PATENT OFFICE.

EDWARD J. SCRAY AND PETER J. SCRAY, OF DE PERE, WISCONSIN.

BOLT.

1,361,627.     Specification of Letters Patent.     Patented Dec. 7, 1920.

Application filed February 17, 1920. Serial No. 359,474.

*To all whom it may concern:*

Be it known that we, EDWARD J. SCRAY and PETER J. SCRAY, citizens of the United States, residing at De Pere, in the county of Brown and State of Wisconsin, have invented new and useful Improvements in Bolts, of which the following is a specification.

The present invention has reference to an improvement in the construction of bolts.

The bolt is primarily, but not necessarily intended for use in connection with the hubs of vehicle wheels, and when so employed is designed to provide means whereby the inner and outer flange members of the hubs will be rigidly held on the wheel, but easily removed therefrom to also permit of the removal of the hub from the wheel when desired.

A further object of the invention is to produce a bolt having both of its ends threaded, but having a body portion between the said ends that is tapered and on the widened end of the body having a lug thereon to be received in a depression in the flanged plate of a hub or any other devices to which the plate is to be attached, the threaded ends of the bolts being engaged by the usual nuts.

The drawings illustrate the improvement.

In the drawings:—

Figure 1 is a sectional view through the hub portion of a wheel illustrating the application of my improved bolt thereon.

Fig. 2 is a view of the bolt.

In Fig. 1 of the drawings I have illustrated my improvement in connection with a wheel and the hub flanges therefor.

The central portion of the wheel is indicated by the numeral 5, the hub by the numeral 6, the inner hub flanges by the numeral 7, and the outer hub flanges by the numeral 8.

Passing through the wheel at determined intervals are the body portions of our improved bolt. The body portion of each of the bolts is cone shaped, being gradually flared from one of the threaded ends to the outer end of the body. The body is indicated by the numeral 10, and on the shoulder at the said widened end there is formed a lug 11. Also on the shoulder there is a centrally disposed outstanding threaded portion 12. The lugs 11 of the bolts are designed to be received in notches 13 on the inner face of the inner flange plate 7, and the threaded portions of the bolts are designed to be engaged by nuts 14 and 15 respectively. The nuts 15 which engage the threaded portion 9 of the bolts contact with washers 16 which may be in the nature of split members to exert a pressure between the flange plate 8 and the said nuts to hold the ends against accidental turning.

With our improved bolt it will be seen that the same may be inserted in a wooden or other structure from one side thereof, and of course, withdrawn in the same direction. The lugs on the shoulders of the body portion of the bolt hold members engaged by the threaded portion 12 from turning, and it is believed that the simplicity and advantages of the construction will be apparent to those skilled in the art to which such inventions appertain without further detail description.

Having thus described the invention, what we claim is:—

A bolt comprising a member having threaded ends, a flared body portion between the ends terminating in a shoulder at the juncture of one of the threaded ends, and a lug on said shoulder.

In testimony whereof we affix our signatures.

EDWARD J. SCRAY.
PETER J. SCRAY.